United States Patent Office 3,506,032
Patented Apr. 14, 1970

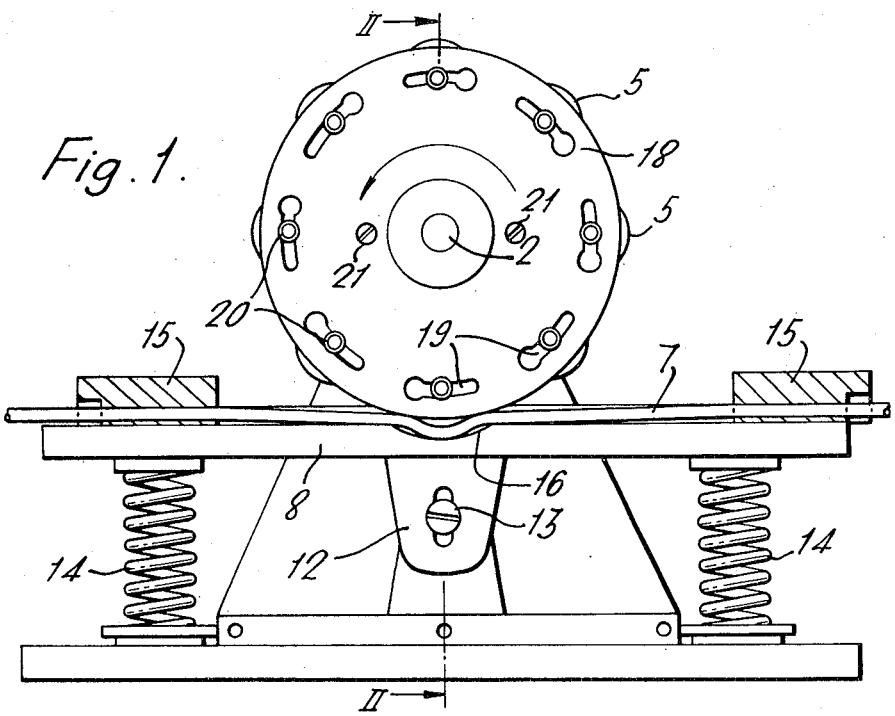
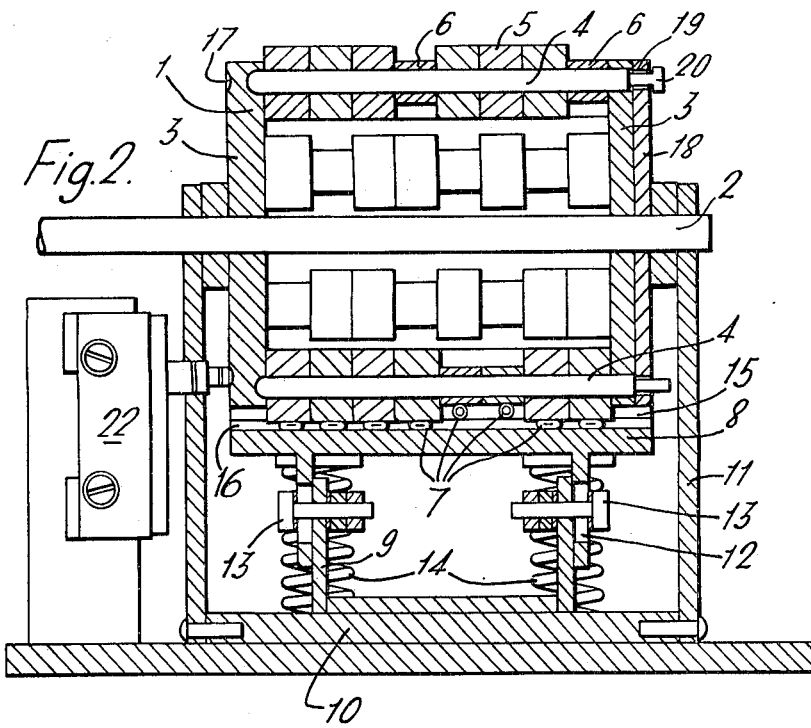

3,506,032
VALVES FOR FLUID LINES
John William Eveleigh, Wantage, and Alan Russell Thomson, Abingdon, England, assignors to United Kingdom Atomic Energy Authority, London, England
Filed Dec. 19, 1966, Ser. No. 602,928
Claims priority, application Great Britain, Mar. 25, 1966, 13,439/66
Int. Cl. E03b 3/00
U.S. Cl. 137—624.2         7 Claims

ABSTRACT OF THE DISCLOSURE

A programming valve for controlling the flow of fluids through flexible pipes. The valve comprises a rotatable member having a cam defining surface arranged such that when the rotatable member is rotated, the cam defining surface is moved to compress or relieve a pipe associated therewith to regulate the flow of fluid through the pipe. The rotatable member includes means to adjust the position of the cam defining surface relative to the rotating member.

---

This invention relates to valves and in particular to selector or programming valves used in process controlling arrangements.

It is often desirable to accurately control the flow of a number of fluids in a process column or chamber, for example, in amino acid chromatographic apparatus a variety of fluids are passed through an analysis column in a specific sequence and for specific periods of time. Previous proposals have included electric-mechanical devices to control the fluid flow but in operation such devices have tended to require continuous skilled maintenance and accurate pre-adjustment and it is an object of the present invention to provide an improved form of selector valve whereby the operating difficulties are minimised.

According to the invention a programming valve for fluids comprises two or more flexible fluid conveying pipes and rotative means defining a cam surface adapted to releasably deform and close each pipe.

Also according to the invention, a programming valve for fluids comprises two or more flexible fluid pipes, a rotative means defining a cam surface adapted to releasably deform and close each pipe and drive means positively interconnecting said cam surface defining means.

In a preferred construction a rotatable member comprises a pair of spaced discs, a plurality of spaced rods extending between the discs, parallel to the axis of rotation of the member and rollers on the rods, said rollers defining a cam surface adapted to releasably depress and close said flexible fluid pipes.

The pipes preferably extend at right angles to the axis of rotation of the member and lie in a plane parallel with the said axis of rotation.

The pipes may lie on a horizontal platform below the rotatable member, the said platform being slidably supported below the member and spring biased towards the member. By adjusting the position of the rollers on and along the rods the rotating member can open and close the fluid pipes in any desired sequence and by controlling the speed of stepwise rotation the valve may be preset to a timed programme.

To enable the nature of the invention to be more readily understood an embodiment of the invention will now be described, by way of example only, with reference to the accompanying drawing. In the drawing:

FIG. I is a side elevation of a selector valve; and

FIG. II is a section view on the line II—II of FIG. I.

Referring to the drawing the selector valve comprises a rotatable member 1 mounted on a drive shaft 2, the member being formed by two spaced discs 3 and a plurality of cam support members in the form of rods 4 which extend between the discs. The rods are arranged parallel to the axis of rotation of the spool and each rod is provided with a set of cam members in the form of rollers 5.

The position of the rollers on each rod may be adjusted by the insertion of spacing collars 6, the collars having a smaller outside diameter than the rollers. Each rod can be provided with up to eight rollers but it will be appreciated that the number of rollers and their position on the rod is determined by the required operating seqeunce of the valve.

The rollers are arranged to press upon and close eight flexible fluid pipes 7 which extend at right angles to the axis of rotation of the spool and are supported on a table or platform 8 located below the spool. The platform is slidably mounted on a bracket 9 integral with the base plate 10 of a unit casing 11, a slotted extension 12 of the platform being secured to the bracket by screws 13. Each end of the platform is supported on compression springs 14 such that the platform is biased upwards to ensure that the tubes contact the rollers. The tubes are spaced apart and secured to the platform by grooved or apertured blocks 15 the blocks extending across the platform at each end such that a tube can be threaded through the first block, under the spool, and then threaded through the second block. The platform is also provided with a transverse groove 16 located directly below the spool. The groove ensures that a tube contacts the roller over an extended length during tube closure.

The end face of one disc 3 is provided with a series of indentations 17 corresponding to the position of each rod 4 the indentations being arranged to operate a micro switch 22. Switch 22 controls, through a relay (not shown), the power supply to an electric drive motor (not shown) coupled to the spool drive shaft.

The rods 4 are secured in position between the plates 3 by a locking plate 18. Plate 18 is provided with a plurality of keyhole slots 19, a reduced diameter end portion 20 of each rod extending through an end plate 3 into a slot in the locking plate. The locking plate is secured to the plate 3 by screws 21.

In operation, the speed of the motor is controlled in a conventional manner such that the spool may be rotated stepwise to open or close the fluid pipes in a desired time arrangement and by a suitable adjustment of the roller positions in any desired operating sequence. It will be appreciated that the position of the rollers may be easily altered by withdrawing the rods 4 through the locking plate 18 and removing and/or altering the position of the rollers using the spacing collars as necessary.

In a modification, a depressor plate (not shown) may be located above each tube such that as a roller is moved into abutment and bears upon the plate the plate is depressed to close the tube. In this manner any pumping action of the roller on the tube is minimised.

The invention is of course not limited to the single embodiment shown, for example, valves having more or less than eight rods may be constructed and additionally the number of rollers provided on each rod is variable to suit the operating requirements.

We claim:

1. A programming valve, comprising, a plurality of flexible pipes, a rotatable member rotatable about an axis, a plurality of cam support members mounted on the rotatable member for rotation therewith about said axis, each cam support member having a plurality of positions along its length, each position corresponding to the location of one of said flexible pipes, each cam support member being constructed such that at any of the said positions along its length it can either (a) support a cam member such that upon rotation of the rotatable member the cam member will cause closing of the flexible pipe at its respective position, or (b) be free of said cam member; a means for securing a cam member at any selected one or ones of said positions along the length of the cam support member, and means for preventing movement of said cam members to non-selected positions, whereby upon rotation of said rotatable member the cam support members successively cooperate with the said pipes, wherein during cooperation of a given cam support member with the flexible pipes each cam member on that cam support member at a selected position causes closing of the pipe at its respective position while any flexible pipe at a non-selected position free from a cam member remains open.

2. A programming valve according to claim 1 wherein said cam support member is an elongated rod and wherein said means for securing and said means for preventing are constituted by said cam members on the rods at the selected positions and spacers on the rods at non-selected positions, wherein said cam members and spacers abut each other along the rod and occupy the full length of the rod at the positions corresponding to said plurality of flexible pipes.

3. A programming valve according to claim 1 including drive means positively interconnecting said cam support members.

4. A programming valve according to claim 1, wherein the flexible pipes are arranged in a side-by-side relationship on a support platform and the said cam members are in side-by-side relationship on said cam support member and rotative about a common axis.

5. A programming valve according to claim 1, wherein the rotatable member comprises a pair of spaced discs, said support members comprise a plurality of spaced rods extending between the discs parallel to the axis of rotation of the member, and said cam means comprises rollers on the rods and adapted to releasably depress and close the flexible pipes.

6. A programming valve according to claim 5 wherein the flexible pipes extend at right angles to the axis of rotation of the member and lie in a plane substantially parallel with the said axis of rotation.

7. A programming valve according to claim 6 wherein the flexible pipes are located on a horizontal platform below the rotatable member, the said platform being slidably supported and spring biassed towards the rotatable member.

References Cited

UNITED STATES PATENTS

| 1,686,003 | 10/1928 | Hottinger | 251—6 X |
| 2,673,011 | 3/1954 | Rood | 251—7 X |
| 3,245,269 | 4/1966 | Ivie | 251—7 X |

FOREIGN PATENTS

| 1,159,104 | 3/1958 | France. |
| 1,171,728 | 10/1958 | France. |
| 838,218 | 6/1960 | Great Britain. |

ALAN COHAN, Primary Examiner

U.S. Cl. X.R.

74—568